United States Patent Office 3,424,279
Patented Jan. 28, 1969

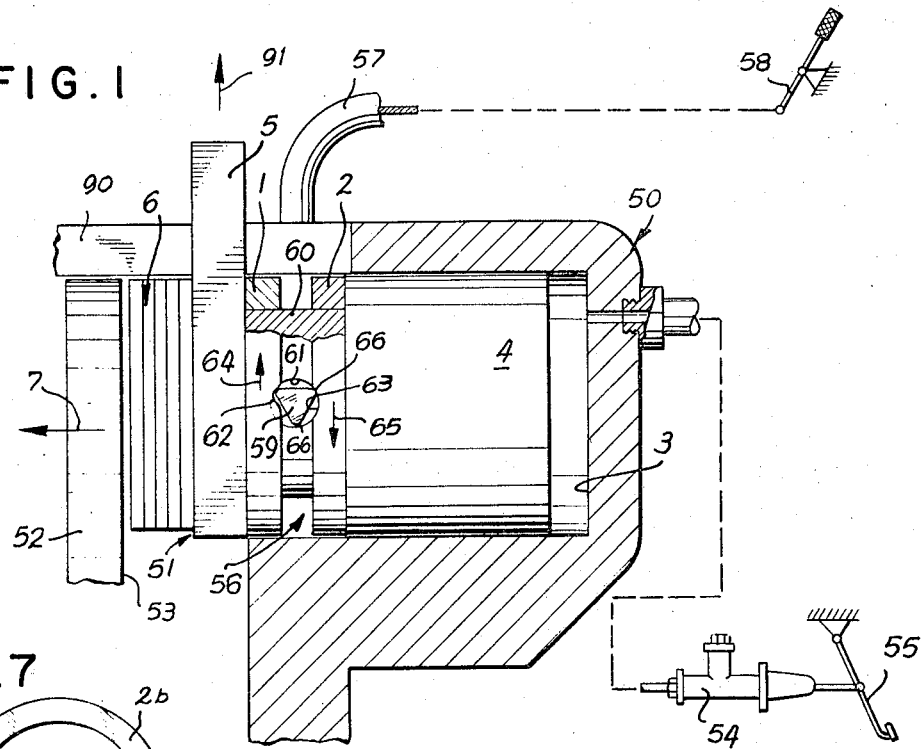

3,424,279
SPOT-TYPE DISK BRAKE WITH
PLURAL ACTUATORS
Heinz Frigger, Langen-Oberlinden, Germany, assignor to
Alfred Teves Maschinen- und Armaturenfabrik KG.,
Frankfurt am Main, Germany, a corporation of
Germany
Filed June 8, 1967, Ser. No. 644,587
Claims priority, application Germany, June 27, 1966,
T 31,463
U.S. Cl. 188—73                                    8 Claims
Int. Cl. F16d 55/14, 65/18, 19/00

ABSTRACT OF THE DISCLOSURE

The invention relates to a disk-brake assembly having a brake yoke or support member in which a piston is mounted for displacement of a brakeshoe against the disk, wherein an auxiliary mechanism is provided for advancing the brakeshoe in the direction of the disk independently of the hydraulic movement thereof for self-adjustment to compensate for wear of the brake lining or for remote operation to lock the brakeshoe against the disk as an emergency brake, parking brake or locking brake. The auxiliary mechanism has a pair of relatively rotatable axially aligned rings interposed between the piston and the brakeshoe co-operating to increase their effective axial length upon relative rotation to urge the brakeshoe in the direction of the disk.

---

My present invention refers to an automotive-vehicle disk-brake assembly having auxiliary means for shifting the brakeshoe in the direction of the disk in a self-adjustment or remotely controlled locking of the brake.

Disk-brake assemblies generally comprise a brake-support member or yoke lying along the periphery of a brake disk, which is fixed to the wheel or the axle of the vehicle, while the brake-support member is mounted upon a relatively stationary portion of the chassis, e.g. the axle housing. A fluid-operated piston is provided in a wheel-brake cylinder of this brake support and is axially shiftable perpendicular to the annular braking faces of the disk to urge the brakeshoe thereagainst when the master cylinder is pressurized. Thus, a pair of such brakeshoes can be provided in juxtaposition with one another on opposite sides of the disk and may sandwich the latter between them. Several arrangements of this type have been proposed and are in common use. In the so-called "floating-yoke" type of disk brake, the yoke is axially shiftable relatively to the disk and only a single wheel-brake cylinder need be provided. In this case, the piston urges a proximal brakeshoe against the disk directly, while the other brakeshoe is drawn by the yoke against the other face of the disk under the hydraulic reaction force at the cylinder.

In another arrangement, the brake disk is limitedly shiftable in the axial direction upon a splined shaft while the brake support is fixed in the axial sense. Here the piston applies its brakeshoe directly against the braking face of the disk and the latter is carried into engagement with the stationary brakeshoe of the other lobe of the yoke. In the "fixed"-yoke system, neither the brake support nor the disk need be axially movable and a pair of wheel-brake cylinders is provided, each having a respective brakeshoe, simultaneously energizable from the same or different master cylinders to apply the respective shoe against the disk.

In my commonly assigned copending application Ser. No. 644,595, filed June 8, 1967 and entitled "Disk-brake Assembly for Automotive Vehicles," I have pointed out that systems of the type previously described have been provided from time to time with self-adjusting mechanisms and/or auxiliary mechanisms for locking the brake. Auxiliary mechanisms of this type have even included a pair of separate brakeshoes and a lever or toggle mechanism actuated from the driver's seat of the vehicle by hand-operated lever or pedal to clamp the auxiliary shoes against the disk and lock the emergency, parking or locking brake. Self-adjusting devices for such brakes have included frictional means co-operating with the piston for re-establishing its retracted position in step with the wear of the brake lining. These devices have been relatively complex, prone to failure as a consequence of the close tolerances of the co-operating parts and were expensive to manufacture and difficult to replace. It is, therefore, the principal object of the present invevntion to provide an improved self-adjusting and/or remotely operable mechanism for shifting the brakeshoe of a disk brake in which the aforementioned disadvantages are avoided.

A further object of my invention is to provide a relatively simple and inexpensive, easily to assemble and disassemble, and efficient mechanism for the self-adjustment of a brakeshoe to compensate for lining or for the remote operation of the brake. These objectives and others which will become apparent hereinafter are attainable, in accordance with the present invention, in a disk-brake system having a brake yoke disposed along the periphery of the disk and provided with a piston for urging the brakeshoe thereagainst, wherein the auxiliary mechanism is disposed within the piston member or between the piston and the cylinder and comprises a pair of relatively rotatable elements centered on the axis of the piston and axially spreadable upon their relative rotation to shift the brakeshoe ahead of the piston against the disk. According to a specific feature of this invention, ratchet teeth, pawls, detent devices, clamping systems or clutch arrangements are provided for locking the brakeshoe in its advanced position.

Yet another feature of this invention resides in the provision of a spreading member between a pair of relatively rotatable annular elements, this spreadable member being swingable about an axis perpendicular to the axis of rotation of the rotatable elements so as to increase its effective length parallel to this latter axis, while being interposed between the relatively rotatable elements. A spreading member of this type is of unround configuration, preferably prismatic with rounded corners, and may have its corners received in respective recesses of the rotatable elements so that, upon relative rotation of these elements, opposite corners of the spreading member are entrained in opposite senses and the spreadable member rotated about its axis. When the spreading member is elongated, it preferably has a rod-like configuration with elliptical or oval section and rounded faces engaging the relatively rotatable element. Other spreading devices can be used, according to this invention, in combination with or in place of the spreading member disclosed. Thus one of the rotatable elements may co-operate with a ball-and-ramp assembly in which the balls or roller elements ride up a ramp upon relative rotation of the members which are so arranged as to be axially displaceable relative to one another. The means for relatively rotating the elements can, according to another specific feature of this invention, include a Bowden line or other flexible element operated from the region of the driver's seat of the vehicle and/or a toggle-lever assembly. Furthermore, the relatively movable parts can include a spindle threadedly coupling them together while, advantageously, the brake-support member is provided with an opening for radial removal of the adjusting device or the auxiliary actuating mechanism as a unit and preferably simultaneously with the removal of the brakeshoes for repair or replacement.

The resulting assembly is thus capable of compensating for brake-lining wear and can be remotely actuated to apply the brakeshoe against the disk for emergency-brake, parking-brake and locking-brake purposes. Moreover, the device is relatively simple and free from disorder, can be easily mounted and dismounted or inspected, can be used in existing disk-brake systems with fixed or movable brake yokes and disposed on one or both sides of the brake yoke. Since a Bowden line may serve as the actuating means, the device can be located in the region of the vehicle wheel in which space is at a premium, the Bowden line requiring a minimum of space.

The above and other objects, features and advantages of the present invention will become more readily apparent from the following description, reference being made to the accompanying drawing in which:

FIG. 1 is an axial cross-sectional view, partly in diagrammatic form, of half a disk-brake assembly embodying the present invention;

FIG. 2 is an enlarged detail view of the auxiliary actuating mechanism in accordance with one aspect of this invention;

FIG. 3 is a view similar to FIG. 2 representing a modification;

FIG. 7 is an elevational view of the device of FIG. 1 showing the two camming bars.

Figure 4:
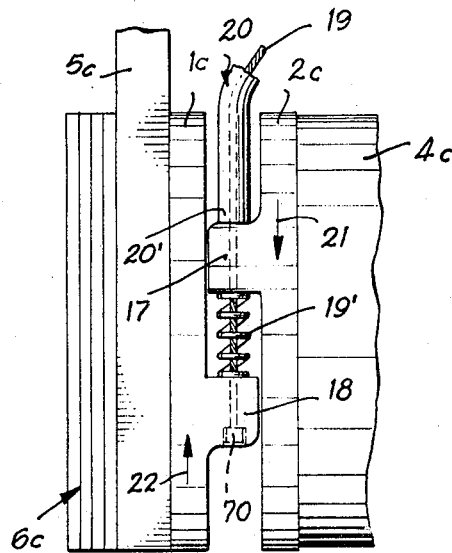
FIG. 4 is an enlarged detail view showing the means for relatively rotating the actuating elements.

Referring first to the braking system in general, it will be apparent that the spot-type disk brake of FIG. 1 comprises a brake housing 50, only one half of which is shown, adapted to be mounted upon a relatively stationary portion of the vehicle, e.g. the axle housing. A brake disk 52 which may be flanked by the two lobes of the brake yoke 50, is engageable by the respective brakeshoes one of which is shown at 51. The brakeshoe 51 comprises a brake lining 6 which is carried by a backing plate 5 and is displaceable in the direction of arrow 7 against the annular braking face 53 of the disk by a piston 4. The piston 4 is slidably received in the wheel-brake cylinder 3 of this assembly and can be of conventional construction or of the constructions described and illustrated in my commonly assigned copending applications mentioned herein. Hydraulic fluid is delivered to the wheel-brake cylinder 3 from the master cylinder 54 of the system, this cylinder being actuated by the brake pedal 55 at the driver's position of the vehicle. An auxiliary actuating mechanism, generally represented at 56, is disposed between the piston 4 and the brakeshoe 51 for operation by a Bowden cable 57 to advance the brakeshoe 51 with respect to the piston 4 when locking-, parking- or emergency-brake operation is desired. The Bowden line 57 is, in turn, tensioned by a lever 58 illustrated diagrammatically but intended to represent the emergency or parking hand-brake lever or pedal in the region of the driver's seat.

The auxiliary mechanism 56 comprises one or more bars 59 extending parallel to the face of the piston 4 between a pair of relatively rotatable elements 1 and 2 constituted as rings which are journaled upon a disk 60 having a diametral opening 61 through which the bar 59 passes. The bar 59 has a triangular cross-section whose vertices are spaced by a distance in excess of the altitude of the triangle and are respectively engaged by recesses 62 and 63 of the rings 1 and 2. Thus, when the rings are rotated in the direction of the arrows 64 and 65, e.g. by the mechanisms illustrated in FIGS. 4, 5 or 6, the bar twists generally about its axis perpendicular to the axis of the piston 4 and cams the rings 1 and 2 axially apart. The edges 66 of the bar are rounded.

In normal brake operation, depression of the pedal 55 forces hydraulic fluid from the master cylinder 54 into the wheel-brake cylinder 3 to advance the piston 4 in the direction of arrow 7 and axially shift the auxiliary mechanism 56 and the brakeshoe 51 toward the disk 52. The brake lining 6 of the shoe thus engages the disk 52 to terminate its rotation relatively to the brake yoke 50. When it is desired to lock the brake, lever 58 is actuated by the vehicle operator and tensions the Bowden line 57 to rotate the rings 1 and 2 relatively to one another and entrain the bar 59. The bar thus urges the rings 1 and 2 apart and, since the ring 2 is seated against the unyielding piston 4, the ring 1 presses the brakeshoe 51 against the disk 52 in the direction of arrow 57.

In FIG. 2, I show a modified spreading arrangement wherein the bar 8 is of elliptical or oval cross-section and has its rounded edges 67 received in notches 69 of the rings 1a and 2a which are journaled on the disk 9; the latter is provided with an axial opening 10 through which the bar 8 passes with clearance. When the rings 1a and 2a are rotatably displaced relatively in the direction of arrows 11 and 13, the effective length $l$ of the bar (i.e. the component parallel to the axis of rotation of the rings and in the direction of movement of the brakeshoe) approaches the true distance L between the edges 67 of the bar 8 received in the notches. Consequently, the rings 1a and 2a are axially spread apart as previously described. A similar system is illustrated in FIG. 3 wherein the prismatic block 15 of nonround cross-section has a square section with rounded edges and is received in the recesses 68b and 69b of the rings 1b and 2b which are relatively rotatable as previously described. Thus, when these rings are rotated in the direction of arrows 11b and 13b, the block 15 is twisted (arrow 16) so that its diagonal is interposed between the rings which are urged axially apart as represented by arrows 12b and 14b. It will be apparent that the system of FIGS. 2 and 3 are interchangeable with that of FIG. 1.

Figure 6:
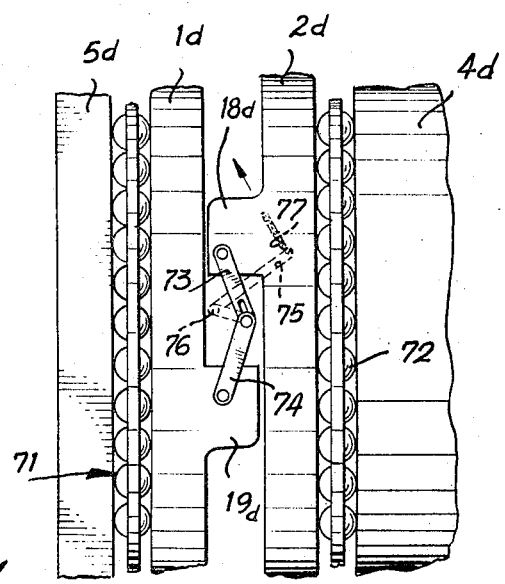
FIG. 6 is a view similar to FIG. 4 of another mechanism for relatively rotating the co-operating parts.

In FIG. 4, I show an arrangement for relatively rotating the rings 1c and 2c and, of course, the axially spreadable relatively rotatable rings of FIGS. 1–3. The means for this purpose include a Bowden cable 20 (equivalent to the Bowden line 57 and actuated by the lever 58) whose core wire 19 is anchored at 70 to an axially extending lug 18 of ring 1c while a complementarily extending lug 17 of ring 2c is connected with a sheath 20' of the Bowden line. Between the lugs 17 and 18 and surrounding the core wire 19, I provide a restoring spring 19' which resiliently resists relative rotation of the rings 1c and 2c in the direction of arrows 21 and 22 when the cable is tensioned. The piston is here represented at 4c while the brakeshoe has a backing plate 5c carrying a lining 6c. Another mechanism for relatively rotating the bodies is represented in FIG. 6 wherein the rings 1d and 2d bear upon the backing plate 5d of the brakeshoe and the piston 4d via thrust bearings or roller, needle or ball type, the bearings being indicated at 71 and 72. The lugs 18d and 19d of this embodiment are interconnected by a toggle linkage 73, 74 whose bell-crank lever 75 can be pivoted at 76 to the disk 60 or 9 and which can be actuated by a Bowden cable 77 to rotate the rings 1d and 2d. This actuating mechanism can be used with the spreading mechanisms of FIGS. 1–3 while the bearing arrangement between the rings and the brakeshoe or piston can likewise be provided in the systems of FIGS. 1–4.

Figure 5:
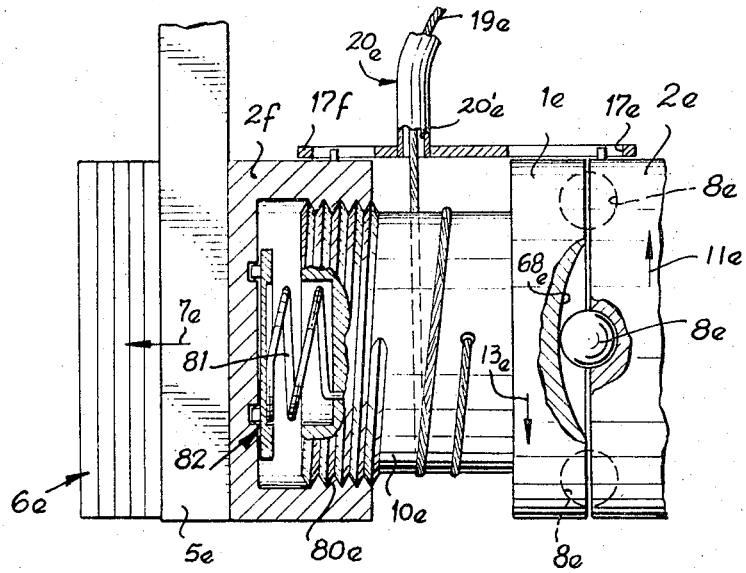
FIG. 5 is an axial cross-sectional view diagrammatically showing still another arrangement embodying the invention.

Yet another arrangement of this general type is illustrated in FIG. 5 in which one of the relatively rotatable elements is a ring 2e which bears axially upon the brakeshoe (not shown) and forms a bearing cage in which the balls 8e are rotatable. The other ring element 1e is provided with ramp-like recesses 68e in which the balls 8e ride and which, upon relative rotation of the rings 1e and 2e in the direction of arrows 11e and 13e, cam the rings 1e and 2e axially apart. Since ring 2e bears upon the piston, the assembly 1e etc. is shifted in the direction of arrow 7e to urge the brakeshoe 5e, 6e against the disk.

Relative rotation of the rings 1e and 2e is accomplished in these systems by a Bowden cable 20e whose core wire 19e is wound about a drum portion 10e of the auxiliary mechanism. This windlass arrangement may be constituted as described generally in my copending application Ser. No. 644,595, filed June 8, 1967, entitled "Disk-Brake Assembly for Automotive Vehicles." The sheath 20e' of the Bowden line is connected to ring 2e as diagrammatically represented at 17e in such manner as to permit relative axial movement of the members 1e and 2e.

The member 1e can, moreover, form a spindle threadedly connected at its other end to a ring 2f adapted to bear axially upon the brakeshoe 5e, 6e when this ring 2f is advanced by the thread 80 as the drum 10e is rotated by the Bowden line 19e. This system advantageously includes a torsion spring 81 connected at one end to the spindle 1e, 10e and having at the other end a rigid or unidirectional clutch coupling 82 with the ring 2f as described in the aforementioned copending application. This spring rotates the spindle 1e, 10e in the opposite sense with the Bowden line 20e is detensioned to release the emergency brake. When, however, excessive brake wear increases the play between the brakeshoe 5e, 6e and the disk, the rotation of the spindle 1e, 10e entrains the spring 81 to step the ratchet 82 whereby the restoring angular movement of member 1e, 10e is limited to a portion only of its original advance. Thus the effective length of the assembly 2f, 10e, 1e, 2e is increased in step with brake-lining wear. A connection 17f couples ring 2f with the Bowden-cable sheath 20e as described in connection with ring 2e. The housing or brake-support member 50 is provided with an opening 90 through while the brakeshoe 5, 6 and the auxiliary mechanism 56 can be removed radially (arrow 91) without dismounting the assembly.

The invention described and illustrated is believed to admit of many modifications within the ability of persons skilled in the art.

I claim:
1. In a spot-type disk-brake assembly having a brake support member disposed along the periphery of a rotatable brake disk and provided with a fluid receiving brake cylinder open in the direction of said disk, an actuating-piston member mounted on said brake-support member in said cylinder and a brakeshoe member movably disposed on said brake-support member adjacent an open end of said cylinder for displacement by said actuating-piston member in the direction of said disk, the improvement which comprises an auxiliary mechanism disposed between a pair of said members and within said cylinder for advancing said brakeshoe member in the direction of said disk, said auxiliary mechanism including a pair of relatively rotatable axially spredable rings of diameter less than that of said cylinder and received therein, said rings acting respectively each upon one of the members of said pair, a noncircular body rotatable about respective axes parallel to said disk and disposed between said rings for axially shifting them relatively upon their rotation in opposite sense, and means for rotating both said rings in opposite senses.

2. The improvement defined in claim 1 wherein said means includes a Bowden cable having a sheath coupled with one of said rings and a core wire coupled with the other of said rings.

3. The improvement defined in claim 1 wherein said means includes a toggle-lever mechanism interconnecting said rings.

4. The improvement defined in claim 1 wherein said brake-support member is provided with a lateral opening for the concurrent removal of said brakeshoe member and said auxiliary mechanism.

5. The improvement defined in claim 1 wherein said body has a pair of edges respectively engaging said rings.

6. The improvement defined in claim 5 wherein said rings are provided with respective recesses and said edges of said body are rounded and received in said recesses of said rings.

7. The improvement defined in claim 6 wherein said body is of generally oval configuration.

8. The improvement defined in claim 6 wherein said body is of generally prismatic configuration.

References Cited

UNITED STATES PATENTS

| 2,063,443 | 12/1936 | Lambert | 188—72 |
| 2,900,051 | 8/1959 | Hillegass | 188—72 |
| 3,155,195 | 11/1964 | Brawerman | 188—73 |
| 3,269,491 | 8/1966 | Belart et al. | 188—73 |
| 3,298,469 | 1/1967 | Robinette | 188—73 |

FOREIGN PATENTS 750,536  6/1956  Great Britain.

GEORGE E. A. HALVOSA, Primary Examiner.

U.S. Cl. X.R.

188—106; 74—99; 192—93